US008103526B1

(12) United States Patent
Pallesen et al.

(10) Patent No.: US 8,103,526 B1
(45) Date of Patent: Jan. 24, 2012

(54) SYSTEM AND METHOD FOR FLEXIBLE INSURANCE RATING CALCULATION

(75) Inventors: Michael R. Pallesen, Ukiah, CA (US); Vilas M. Athavale, Santa Clara, CA (US); Sridhar Gunapu, Sunnyvale, CA (US)

(73) Assignee: Insweb Corporation, Redwood City, CA (US)

( * ) Notice: Subject to any disclaimer, the term of this patent is extended or adjusted under 35 U.S.C. 154(b) by 952 days.

(21) Appl. No.: 09/521,005

(22) Filed: Mar. 7, 2000

(51) Int. Cl.
*G06Q 40/00* (2006.01)
(52) U.S. Cl. ............... 705/4; 705/20; 705/26; 717/138; 707/3
(58) Field of Classification Search ............... 705/4, 20, 705/26; 707/3; 717/138–143
See application file for complete search history.

(56) References Cited

U.S. PATENT DOCUMENTS

| | | | | | |
|---|---|---|---|---|---|
| 4,831,526 | A | * | 5/1989 | Luchs et al. | 705/4 |
| 4,992,940 | A | * | 2/1991 | Dworkin | 705/26 |
| 5,191,522 | A | * | 3/1993 | Bosco et al. | 705/4 |
| 5,523,942 | A | * | 6/1996 | Tyler et al. | 705/34 |
| 5,627,914 | A | * | 5/1997 | Pagallo | 382/189 |
| 5,787,453 | A | * | 7/1998 | Kennedy | 715/538 |
| 5,956,691 | A | * | 9/1999 | Powers | 705/4 |
| 5,960,407 | A | * | 9/1999 | Vivona | 705/10 |
| 5,970,464 | A | * | 10/1999 | Apte et al. | 705/4 |
| 5,995,961 | A | * | 11/1999 | Levy et al. | 707/2 |
| 6,076,071 | A | * | 6/2000 | Freeny, Jr. | 705/26 |
| 6,182,048 | B1 | * | 1/2001 | Osborn et al. | 705/4 |
| 6,185,540 | B1 | * | 2/2001 | Schreitmueller et al. | 705/4 |
| 6,338,067 | B1 | * | 1/2002 | Baker et al. | 707/100 |
| 6,378,126 | B2 | * | 4/2002 | Tang | 717/143 |
| 6,385,642 | B1 | * | 5/2002 | Chlan et al. | 709/203 |
| 6,553,350 | B2 | * | 4/2003 | Carter | 705/20 |
| 2002/0120527 | A1 | * | 8/2002 | Lam et al. | 705/26 |
| 2006/0271414 | A1 | * | 11/2006 | Fenton et al. | 705/4 |

FOREIGN PATENT DOCUMENTS

WO       WO 88/08160       * 10/1988

OTHER PUBLICATIONS

Anonymous, "Parsing of True Equations," Feb. 1, 1984, IBM Technical Disclosure Bulletin, v26, Issue 9, p. 4649.*

* cited by examiner

*Primary Examiner* — Lena Najarian
(74) *Attorney, Agent, or Firm* — Campbell Stephenson LLP

(57) ABSTRACT

A product rate calculation system operating as a rating server (e.g., a process executing on a server computer system, or a process executing on the same computer system as a client process but serving information to the client process) advantageously provides a flexible insurance rating calculation system that can easily be modified and expanded, while still providing quick, and even real-time responsiveness to product rate requests. The product rate calculation system includes an interface to a product information database and a cache for storing product rate information for efficient reuse. The product rate information includes product rate expressions that are parsed and evaluated by an expression evaluation routine to determine a product rate. As part of the evaluation process, additional product rate information (such as look-up table data and numerical constants) as well as consumer information can be used.

35 Claims, 4 Drawing Sheets

SYSTEM AND METHOD FOR FLEXIBLE INSURANCE RATING CALCULATION

BACKGROUND OF THE INVENTION

1. Field of the Invention

This invention relates to systems and methods for calculating product rates, and particularly to systems and methods for calculating insurance product rates using computer systems in a client/server environment.

2. Description of the Related Art

As more users begin to take advantage of businesses which use the Internet and the World Wide Web (the "web") to describe, market, sell, and deliver products and services, the performance of business web sites (e.g., web server applications running on server computer systems) becomes an issue of greater importance.

Depending on the type of product or service that is the subject of web-based electronic commerce, the challenges to providing rapid or even real-time responses to consumers can be great. For example, in providing insurance product information via the web, a website should efficiently gather consumer information and process that information to provide insurance product rate quotes. In general, an insurance product rate is the cost of a given unit of insurance. For example, in ordinary life insurance, the rate is the price of $1,000 of the face amount of the policy. The process of calculating an insurance rate (i.e., the rating process) can be very complicated and can require evaluating mathematical expressions that depend on consumer information, rating factors from look-up tables, and other relevant information. Compounding the difficulty inherent in this process is the desire to be able to calculate rates for a variety of different insurance products (e.g., automobile insurance, health insurance, life insurance, home insurance, renter's insurance) offered by a variety of different providers or insurance carriers. Thus, any one product from a particular carrier might require a rate calculation that is unique to that product/carrier combination.

In order to quickly calculate insurance product rates, the necessary mathematical expressions and data are typically encoded into the programming for the insurance product application (e.g., the web server application or application running in conjunction with a web server) that gathers information from a consumer and returns rate quote information (and perhaps other types of information) to the consumer. However, as product rate information changes, or as the need to add new products and/or carriers arises, the process of modifying the insurance product application can become cumbersome and inefficient.

Accordingly, it is desirable to have a flexible insurance rating calculation system that can be easily modified to include new or updated product rate information, and that can quickly calculate product rates so that they can be returned to a consumer requesting such a rate in a short amount of time, or even in real-time. Additionally, it is desirable for such a rate calculation system to be easily scaleable in that it can accommodate many contemporaneous rate requests, accommodate multiple simultaneous requests (i.e., a batch request), and allow for the addition of multiple products and/or carriers. Furthermore, it is desirable for such a rate calculation system to have the ability to calculate rates for a variety of different types of products.

SUMMARY OF THE INVENTION

It has been discovered that a product rate calculation system operating as a rating server (e.g., a process executing on a server computer system, or a process executing on the same computer system as a client process but serving information to the client process) advantageously provides a flexible insurance rating calculation system that can easily be modified and expanded, while still providing quick, and even real-time responsiveness to product rate requests. The product rate calculation system includes an interface to a product information database and a cache for storing product rate information for efficient reuse. The product rate information includes product rate expressions that are parsed and evaluated by an expression evaluation routine to determine a product rate. As part of the evaluation process, additional product rate information (such as look-up table data and numerical constants) as well as consumer information can be used.

Accordingly, one aspect of the present invention provides a product rate calculation system including a database interface, a product rate information cache, an expression evaluation routine, and a client interface. The database interface is operable to request and receive product rate information from a database, the product rate information including at least one product rate expression. The product rate information cache stores product rate information. The expression evaluation routine is operable to parse a product rate expression stored in the product rate information cache into at least one token, and is also operable to evaluate the at least one token to determine a product rate. The client interface is operable to provide the product rate to a client application running on a computer system In another aspect of the invention, a method of calculating a product rate is disclosed. Product rate information is loaded, and the product rate information includes at least one product rate expression from a database. The product rate information is stored in a cache. A request is received for a product rate from a client application running on a computer system. The at least one product rate expression stored in the cache is parsed into at least one token. The at least one token is evaluated to determine the product rate. The product rate is transmitted to the client application running on the computer system.

Another aspect of the present invention provides a system for calculating product rates including a processor and a memory cache. The processor is configured to request and receive product rate information from a database, the product rate information including at least one product rate expression. The memory cache is configured to store the product rate information including the at least one product rate expression. The processor is further configured to evaluate the at least one product rate expression by parsing the at least one product rate expression into at least one token and evaluating the at least one token to determine a product rate.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Client/server computer systems operating in a distributed computing environment (e.g., web client/server computer systems) are routinely used to generate business or business leads for a variety of enterprises. One specific example of this type of business activity is providing insurance information to, and generating leads from users of a web based insurance site. (The focus throughout this application will be on insurance business applications, but those having ordinary skill in the art will readily recognize the applicability of many of the described techniques to a variety of different fields of business and both web-based and non-web-based client/server activities in general.) The information that is provided by the user (typically a consumer) varies depending on both the subject of the insurance policy to be underwritten and the type of coverage desired. For instance, in the case of automobile insurance, the information provided by the user includes information about the vehicle or vehicles to be covered under the policy, information about the driver or drivers to be covered under the policy, and information about the type of coverage requested by the user.

Figure 1:
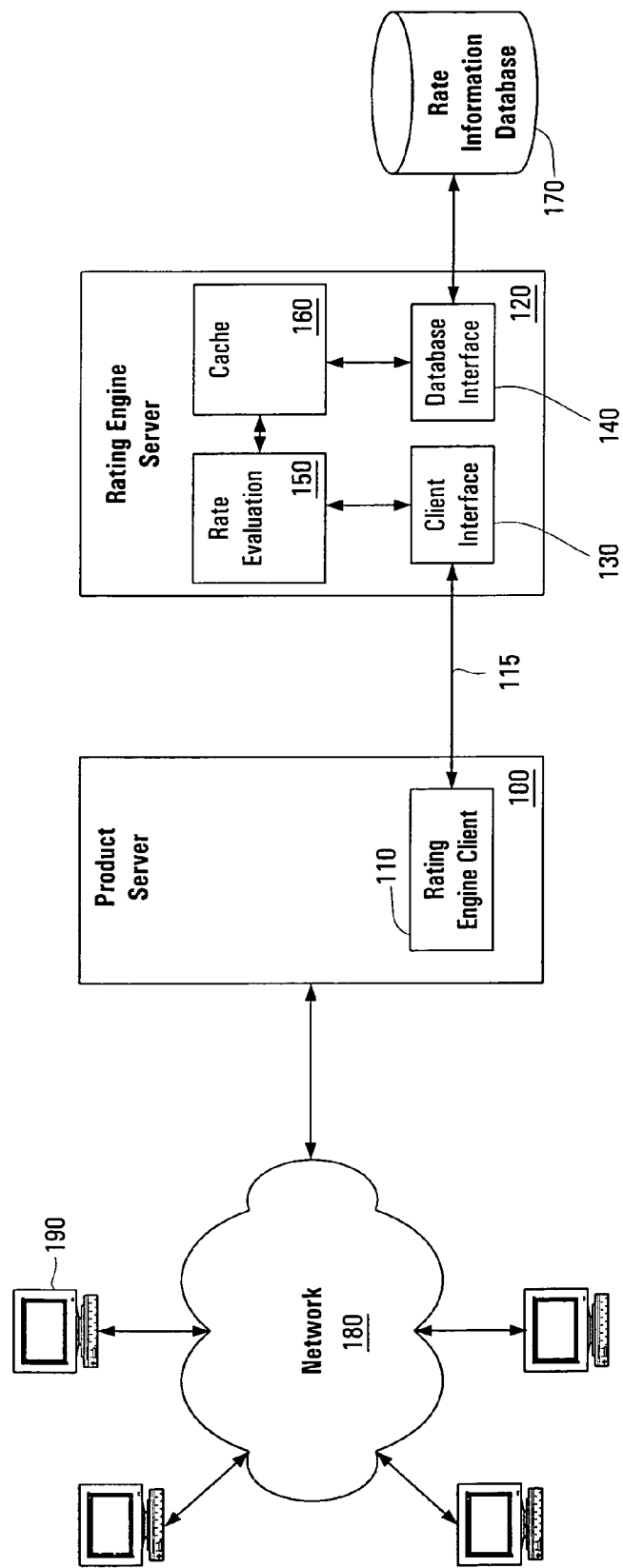
FIG. 1 illustrates a client/server computing environment utilizing a product rate calculation system.

FIG. 1 illustrates a client/server computing environment for providing insurance product information to users via, for example, an interactive web site, and utilizing a product rate calculation system. Server 100 is typically a web server including the necessary hardware and software to serve hypertext markup language (HTML) documents, associated files, and scripts to one or more user client (typically web client) computer systems 190 when requested by a user of, or an autonomous program executing on a user client computer system. User client computer systems 190 typically utilize HTML browsers to display the HTML documents, and to generally interact with server 100. As illustrated, server 100 and clients 190 are coupled to each other through a communications network 180, such as the Internet. Server 100 and clients 190 can alternately be coupled to each other through point-to-point connections, or dedicated connections. Server 100 is typically an Intel Pentium-based or RISC based computer system equipped with one or more processors, memory, input/output interfaces, a network interface, secondary storage devices, and a user interface.

Server 100 is a product server in that it typically includes one or more insurance product applications executing on the server hardware, for example automobile, life, home, health, and/or renter's insurance product applications. Product applications provide users, through common web serving software, with functionality and content for different insurance products. As illustrated, product server 100 can serve both web and product server applications. For example, one server computer system can execute one or more separate processes for insurance product applications while also executing one or more processes specifically for serving web content to user client computer systems 190. Alternately, the insurance product server applications and any web server applications can each execute on a separate computer system. Or, there can be some combination of the two previous approaches. Thus, product server 100 is merely illustrative of web/product server schemes.

Each insurance product application typically utilizes a respective application database (not shown) to store data associated with that particular insurance product, although one or more insurance product applications can share a database. The databases used, and the database management systems (DBMSs) used to allow access to and control of the databases can be based on a variety of database schemes, but are typically relational in nature, for example structured query language (SQL) databases and DBMSs.

In the example illustrated in FIG. 1, rating engine client 110 is an insurance product application that is also a client, e.g., a client process or possibly a "client server" (if, for example, web serving and product applications are combined), to rating engine server 120. Rating engine server 120 includes basic components for a product rate calculation system: rating engine client interface 130, rate evaluation routine 150, cache 160, and product rate information database interface 140. Note that these may be separate software components, or separate portions of a single rating server engine executable, or some combination of the two. For example, rate evaluation routine 150 and cache 160 can be implemented as a single component.

When presented with the need to calculate a product rate, for example a user of computer system 190 has requested a health insurance product rate, rating engine client 110 provides some of the information needed by rating engine server 120 (typically consumer information) to client interface 130 via communication pathway 115. Communication pathway 115 can be a network connection, in the case where product server 100 and rating engine server 120 are, or are executing on, separate computer systems. Alternately, communication pathway 115 can be a message passing scheme, implemented within application or operating system code itself, to exchange information between processes. Consumer information typically takes the form of one or more sets of name-value pairs that represent consumer, and possibly product, factors and their associated values that are useful in calculating a product rate.

For example, several sets of name-value pairs might be consumer_id, zip_code, and coverage_amount (along with associated values based on a specific user request). Other name-value pairs might focus on the particular product, such as carrier_id and product_id (again, along with associated values based on a specific user request). If a user requests rates from a variety of carriers, then the set of name-value pairs might be an array of sets of name-value pairs indicating, for example, the various carrier_ids and product_ids corresponding to desired products. Arrays of sets of name-value pairs can also be used when, for example, rate information is desired for a variety of consumers, e.g., group health insurance rating.

Communication pathway 115 can also be used by rating engine client 110 to maintain a connection between product server 100 and rating engine server 120 so that the connection is available if a request for a product rate is made. Moreover, rating engine client 110 can be designed to report timed-out connection requests to rating engine server 120, as well as provide failover to a redundant rating engine server (not shown).

In addition to receiving information needed by rating engine server 120, client interface 130 forwards such information to rate evaluation routine 150, receives calculated rates from rate evaluation routine 150, and transmits calculated rates back to rating engine client 110. Client interface 130, can also implement additional rating engine server features such as: initiating the calculation process; receiving and forwarding rating engine server maintenance commands (e.g., a command to flush cache 160 and reload information from rate information database 170); providing rating engine performance monitoring (e.g., number of users connected to the server, number of entries in the cache, cache read/write statistics, rate request statistics; and testing utilities to determine if rate calculations are correct. Such features can be, in general, implemented in any of rating engine client interface 130, rate evaluation routine 150, cache 160, and product rate information database interface 140, or can be implemented in some other fashion within rating engine server 120.

Rate information database 170 contains much of the information necessary to perform a rate calculation. This information is stored as database records, and includes: insurance rate formulae stored as logical and algebraic expressions, n-dimensional (i.e., zero, one or more) tables of rating factors, miscellaneous numeric values; and any other information used to calculate insurance rates. When instructed to (for example, when first activated), database interface 140 loads rate information from rate information database 170 into cache 160. Cache 160 is typically implemented in high capacity, volatile memory (e.g., program memory) with appropriate program code to support caching, so that rate information is readily available to rate evaluation routine 150, thereby enhancing rating performance. However, other caching schemes can be implemented as is well known to those having ordinary skill in the art.

Since rating engine server 120, can be designed to support rating engine clients for different insurance products, rate information database 170 can include rate information for a variety of different types of insurance products. Alternatively, rating engine server 120, and more specifically database interface 140 can interface with numerous different rate information databases.

When requested to provide a rate for an insurance product, rate evaluation routine 150 retrieves, as needed, product information from cache 160 and uses the product information in conjunction with consumer information received from rating engine client 110 via client interface 130 to calculate a rate. The rate evaluation process is described in greater detail below in conjunction with FIG. 3.

Figure 2:
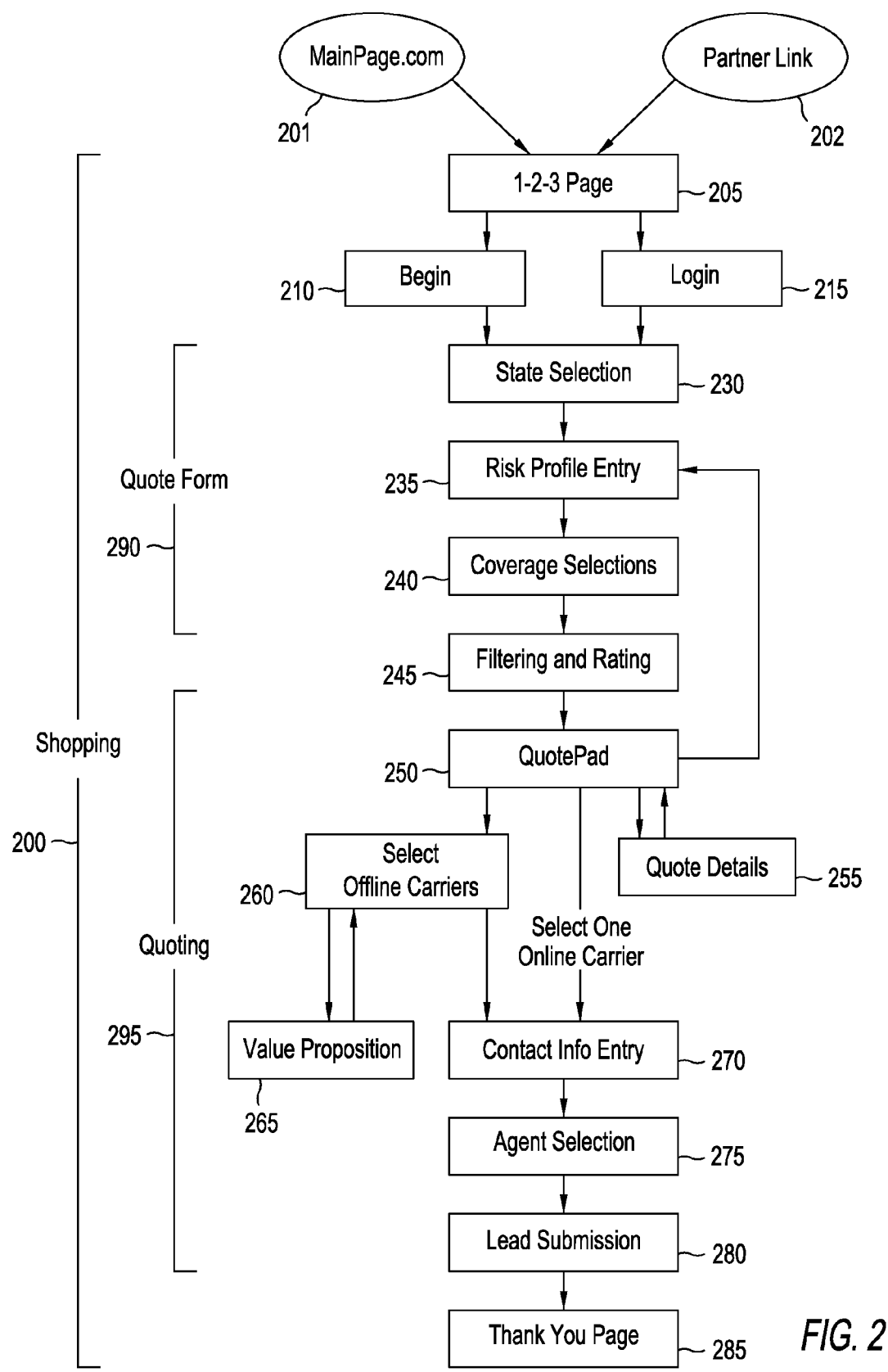
FIG. 2 is a functional diagram of the program flow for a typical insurance product application executing on, for example, a product server, such as that illustrated in FIG. 1.

FIG. 2 is an example of the program flow for a typical insurance product application executing on, for example, product server 100. The program flow illustrated in FIG. 2 is common to most insurance products, and includes a sequence of steps or phases in which a user interacts with the product application. Since insurance quotes are typically based on statistical data which is correlated to the information provided by a potential insured, computers can greatly reduce the time and expense associated with generating insurance quotes. In particular, computer quoting systems allow insurance agents to provide accurate quotes to potential clients in a matter of minutes by inputting the client's information into the system and automatically generating quotes based on the information provided by the client.

A user begins the process by entering the product application through the first page of the product, 1-2-3 page 205 via a hyperlink 201 located on the home page of a web server operating on product server 100, or via a hyperlink 202 from another web site, such as a web site belonging to a business partner, portal, or search engine. The first page 205 of the product typically explains the process to follow. The user begins the data entry process either by accessing an existing account on the system (215) or by creating a new account (210) and entering appropriate information about the user.

Because insurance requirements, laws, coverage, and costs vary significantly from state to state, the first step in obtaining quote information is to select a state of residence 230. Next, the user provides information about their risk profile 235. For example, if the user has entered the automobile insurance product application, 235 might require automobile information, driving record information, and other personal information. In 240, the user provides information about the type and amount of coverage desired, e.g., deductible amount, maximum liability, etc. Activities in 230, 235, and 240 are generally referred to as quote form activities 290 because they are analogous to traditional paper forms used to gather information needed to process an insurance quote request.

Once the quote form activities 290 are complete, a quoting session 295 is initiated. The process starts with filtering 245, in which the system evaluates a set of rules against the risk profile for each available product offered by an insurance carrier available in the program. Products that pass the filtering process are sent through a rating process to determine the appropriate quote for the user, such as the rating process described in conjunction with FIG. 3, and using a system such as the system illustrated in FIG. 1. Quotes are presented to the user via QuotePad 250. QuotePad 250 contains information about both on-line and off-line quotes available to the user. On-line quotes can be presented directly to the user by the insurance product application, and the QuotePad can include links to the providers associated with the on-line quotes. In some instances, a user can request detailed information about the quotes in 255. Still other information might include how to contact an agent or the provider via e-mail, telephone, or traditional mail. Off-line quotes are sent to the user by alternate means such as e-mail or regular mail at a later time, and are selected at 260. When the user selects one or more products for carrier submission, the product selection generates either a request for coverage (RFC or instant lead) or a request for quote (RFQ or delayed lead). With an RFC, the user has been presented with an instant quote for a product. For an RFQ, a carrier is responsible for generating a quote and returning it to the user. Once a user has selected a product for lead submission, information must be collected such as contact information 270 that enables a carrier to respond to the user, or agent selection 275. In 280 the lead is submitted to the carrier, and in 285 an appropriate message is displayed, thanking the user. The process also allows for specialized marketing such as value proposition 265. A value proposition page can include the presentation made by a carrier to users regarding products offered by the carrier. The activities described in FIG. 2 can collectively be described as a shopping session 200.

Figure 3:
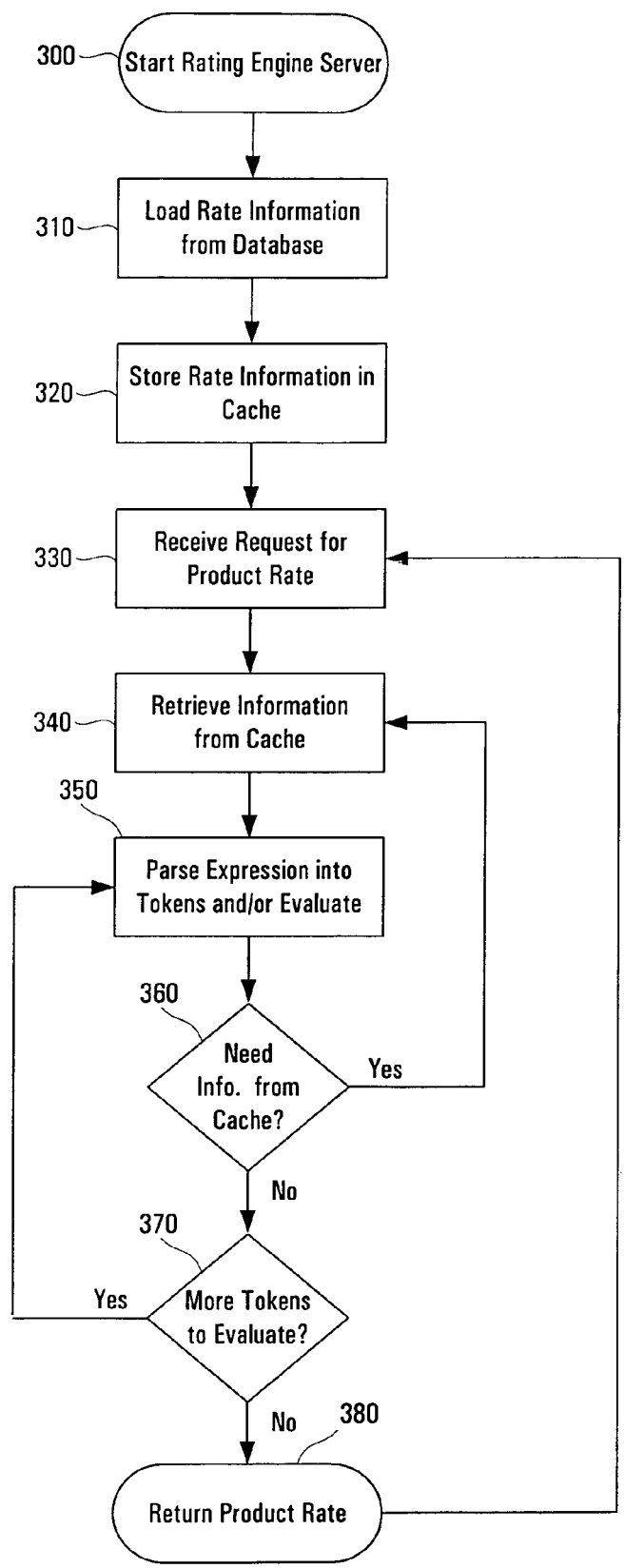
FIG. 3 is a flow chart illustrating one possible implementation of a product rate calculation system.

FIG. 3 is a flow chart illustrating one possible use for a product rate calculation system. Use of the system begins at 300 where the rating engine server, such as rating engine server 120, is started. Starting of a rating engine server can comprise executing a rating engine server executable by a system administrator, or may comprise a specific activation command by some other application, such as an insurance product application. Product rate information is loaded from a product rate information database (310) and stored in a cache (320) soon after the rating engine server is started. It is preferable that information be loaded and stored in the cache as few times as possible, to reduce consumption of rating engine server computing and I/O resources. However, product rate information is typically re-loaded and re-stored in the cache when new information is added to the product rate information database, or when existing information is modified.

In step 330, the rating engine server receives a request for a product rate. Based upon the request, and perhaps consumer information received in conjunction with the request, appropriate product rate information is retrieved (340) from the cache. The first piece of product rate information retrieved is typically a logical and/or algebraic expression that must be evaluated to produce the desired rate. Such product rate expressions are preferably stored as text strings that are then parsed (350) into one or more tokens for evaluation. One advantage to having the product rate expressions stored as database records that are subsequently loaded from database and stored into the cache is that the rating engine server can be generic with respect to the type of insurance products for which it calculates rates. That is, virtually any type of product rate expression can be used, and product rate expressions can be updated simply by replacing a database record. Thus, the rating engine server can "reprogram" itself for each insurance product, even for products that are added to the database long after the rating engine server program is written.

Two common types of tokens that can make up a product rate expression are operators and operands. Operators indicate the type of operation to be performed with one or more operands. Operators are typically either numeric operators or logic operators. Common numeric operators include: addition, subtraction, multiplication, division, equals, less-than, greater-than, less-than-or-equal, greater-than-or-equal, not-equal, etc. Common logic operators include AND, NOT, OR, NOR, NAND, XOR, etc. Other types of operators (e.g., string or character operators) can also be implemented. Operands typically include constant numeric or logic values (including arrays of constants of one or more dimensions), variables (including arrays of variables of one or more dimensions), functions, and strings.

As is well known in the art, the way in which operators and operands are arranged in an expression, typically dictates how the expression is evaluated, i.e., the order of operation. To that end, there are three common schemes or notations for arranging tokens for evaluation: in-fix notation, pre-fix notation, and post-fix notation. In-fix notation is the probably the most familiar of the three notation schemes, and is characterized by locating operators between associated operands. In pre-fix notation, operators generally precede their associated operands, and in post-fix notation (also known as reverse polish notation (RPN)), the operators generally follow their associated operands. So, for example, adding the numbers 8 and 9 yields the following expressions in the different notations:

in-fix: 8+9
pre-fix: +8 9
post-fix: 8 9+

The relative advantages of the different notation schemes becomes apparent when more complex expressions are examined, such as adding the quotient of 3 divided by 4 to the product of 7 and 8:

in-fix: ((3/4)+(7·8))
pre-fix: +/3 4·7 8
post-fix: 3 4/7 8·+

In a preferred embodiment, product rate expressions are stored in post-fix notation so that the expressions can be quickly and easily parsed and evaluated without the need, for example, of more complex logic to identify relationships within the expression, such as identifying corresponding pairs of parenthesis in the in-fix notation example. Nevertheless, any notational scheme can be used to encode product rate expressions so long as the appropriate evaluation logic is present in the system.

The operations performed to evaluate tokens in a product rate expression depend upon the types of tokens. Thus, if one of the tokens to be evaluated is an insurance rate look-up table that is indexed based on consumer information, evaluating that token can require using supplied consumer information received in 330 to retrieve information from an insurance rate look-up table previously stored in the cache during step 320. Thus, 360 indicates that the determination is made whether product rate information is needed from the cache. As previously noted, that product rate information can take a variety of forms, and may even be a sub-expression that requires parsing and evaluation itself. If product rate information is needed, the information is retrieved in 340 and the evaluation process proceeds forward. When no additional product rate information is needed to evaluate the current token or tokens, operation proceeds to 370 to determine if additional tokens remain in the product rate expression to be parsed and/or evaluated. If so, the process returns to 350, and if not, evaluation of the product rate expression is complete. A product rate is returned to the rating engine client (380), and operation of the rating engine server returns to 330 to await the next request.

As previously noted, rate requests can be made in batch form, so the operation of the rating process can be modified accordingly. For example, multiple rates might be calculated before any rates are returned to the requesting rating engine client.

Figure 4:
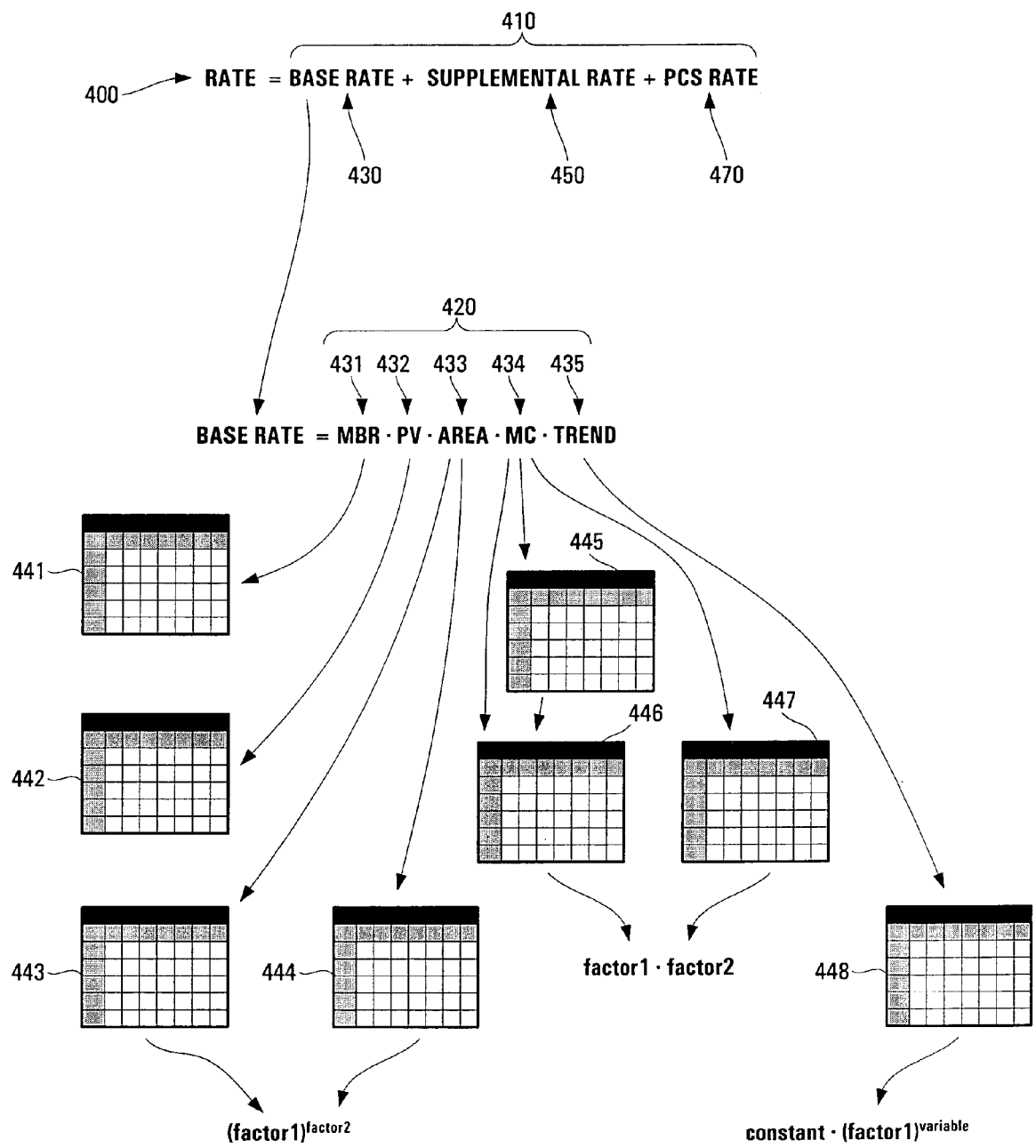
FIG. 4 illustrates a partial example of an insurance product rate calculation.

FIG. 4 illustrates an example of an insurance product rate calculation that can be performed using the disclosed product rate calculation system. The rate to be calculated is for a group employee medical benefits insurance product. Rate 400 is determined by the sum of three product segments 410, specifically base rate segment 430, supplemental accident and disability rate segment 450, and prescription card service (PCS) rate segment 470. Various consumer, rating, and product factors are used to determine the values for each segment 410, and thus the value of rate 400. Consumer factors are typically some attribute of or associated with the insurance product consumer such as location, age, marital status, desired coverage options, etc. Consumer factors are typically used to determine rating factors for a particular product, or for a segment of the product. Rating factors are usually obtained from a look-up table that is indexed based upon consumer factors, but can be obtained by evaluating a mathematical expression based on consumer factors, or by some other appropriate means. Product factors are typically determined based on consumer and rating factors, and then multiplied together to yield a product segment.

For example, base rate segment 430 is the product of five product factors 420, specifically medical base rate factor (MBR) 431, plan variation factor (PV) 432, area factor 433, managed care factor (MC) 434, and trend factor 435. Each of the product factors 420 can depend on consumer related information, product related information, and rating factors associated with the two. Thus, to determine MBR 431, consumer information such as employee age, family status (e.g., the number of adults and children in the family), and whether maternity coverage is selected to select a base rate from look-up table 441. In this example, look-up table 441 is three dimensional, being indexed by age, family status, and the maternity option. The PV factor typically depends upon coverage options such as the insurance plan deductible, the percentage of expenses covered by the plan, and stop-loss limitations (i.e., any provision in a plan designed to cut off an insurer's losses at a given point). Again, these values are used to index into a look-up table (442) in order to find the plan variation product factor.

Some product factors may require more complicated determinations. For example, area factor 433 is calculated by determining a first rating factor from a look-up table (443) indexed by insurance plan deductible and the percentage of expenses covered by the plan, and then raising that factor to a power determined from another look-up table (444) indexed by the employee's location. Still other calculations can require the use of a rating factor determined from one look-up table as an index into another look-up table. To determine MC factor 434, a grouping factor is determined from a look-up table (445) managed care network, product type, and location. That grouping factor is used, along with additional factors such as utilization review, product type, plan deductible and the percentage of expenses covered by the plan to index into look-up table 446 to determine a first rating factor. Product type and out-of-net differential information is used to look up a second rating factor in look-up table 447, and the product of the first and second rating factors determines the MC factor 434. Trend factor 435 can be determined by finding a rating factor based on the date that the rating is performed from table 448, raising the rating factor to a power determined by the number of months between the rating date and a product trend date, and multiplying that value by a constant.

Supplemental accident and disability rate segment 450 and PCS rate segment 470 can be calculated in a similar manner using appropriate product factors. The preceding examples are presented merely to illustrate possible product rate expression evaluation steps, and those having ordinary skill in the art will readily recognize variations depending upon, for example, the type of product for which a rate is requested.

Although illustrated broken into segments and product factors, the expression used to calculate rate 400 can easily be represented as a single complete expression in any appropriate operation notation, with the operators and operands contained therein representing the aforementioned tokens. Thus, any of product segments 410 and product factors 420 can be considered tokens (e.g., operands), as can the mathematical operators used to combine them.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A product rate calculation system comprising:
   a processor;
   a computer readable medium, wherein the computer readable medium is at least one of an electronic storage medium, a magnetic storage medium, and an optical storage medium;
   a database interface operable to request and receive product rate information from a database, the product rate information including at least one product rate expression;
   a product rate information cache storing the product rate information received from the database;
   an expression evaluation routine operable to parse a product rate expression stored in the product rate information cache into at least one token, and operable to evaluate the at least one token to determine a product rate; and
   a client interface operable to provide the product rate to a client application running on a computer system, wherein at least one of the database interface, the product rate information cache, the expression evaluation routine and the client interface is encoded in the computer readable medium as instructions executable on the processor.

2. The product rate calculation system of claim 1 wherein the product rate information includes at least one multi-dimensional table of data.

3. The product rate calculation system of claim 2 wherein at least one dimension of the at least one multi-dimensional table is indexed by consumer information provided to the client interface.

4. The product rate calculation system of claim 1 wherein the at least one token is a plurality of tokens, at least one of the plurality of tokens being an operand, and at least one other of the plurality of tokens being an operator.

5. The product rate calculation system of claim 4 wherein the operand is one of a constant numeric value, a variable, a logic value, a function, and a string; and wherein the operator is one of a numeric operator and a logic operator.

6. The product rate calculation system of claim 4 wherein the operand and the operator are arranged in the product rate expression following one of post-fix, pre-fix, and in-fix notation.

7. The product rate calculation system of claim 1 wherein product rate information is insurance product rate information.

8. The product rate calculation system of claim 1 wherein the expression evaluation routine uses consumer information provided to the client interface to evaluate the at least one token.

9. The product rate calculation system of claim 1 further comprising the client application running on the computer system and being configured to:
   provide product information, including the product rate, to a user;
   provide consumer information to the client interface; and
   receive the product rate.

10. The product rate calculation system of claim 9 wherein the product information is product information for at least one of home insurance, life insurance, health insurance, automobile insurance, and renter's insurance.

11. The product rate calculation system of claim 9 wherein the client application running on the computer system is a web server application.

12. The product rate calculation system of claim 11 further comprising a web-client computer system, the computer system and the web-client computer system being coupled via a network.

13. The product rate calculation system of claim 1 further comprising a database operable to receive a product rate information request from the database interface and provide product rate information to the database interface, the database including at least one of the product rate expression, a multi-dimensional table of data, and a numeric value stored as a database record.

14. A method of calculating a product rate comprising:
   loading product rate information including at least one product rate expression from a database;
   storing the product rate information loaded from the database in a cache;
   receiving a request for a product rate from a client application running on a computer system;
   parsing the at least one product rate expression stored in the cache into at least one token;
   evaluating the at least one token to determine the product rate; and
   transmitting the product rate to the client application running on the computer system.

15. The method of claim 14 wherein the product rate information includes at least one of a multi-dimensional table of data and a numeric value.

16. The method of claim 14 wherein the product rate information is stored as a plurality of records in the database.

17. The method of claim 14 wherein the receiving a request further comprises receiving consumer information from the client application running on the computer system, the consumer information being used to evaluate the at least one token to determine the product rate.

18. The method of claim 14 wherein the product rate information is insurance product rate information.

19. The method of claim 14 wherein the loading and storing are performed once, and wherein the receiving, parsing, evaluating, and transmitting are performed a plurality of times.

20. The method of claim 14 wherein the at least one token is a plurality of tokens, at least one of the plurality of tokens being an operand, and at least one other of the plurality of tokens being an operator.

21. The method of claim 20 wherein the operand is one of a constant numeric value, a variable, a logic value, a function, and a string; and wherein the operator is one of a numeric operator and a logic operator.

22. The method of claim 20 wherein the operand and the operator are arranged in the product rate expression following one of post-fix, pre-fix, and in-fix notation.

23. The method of claim 14 wherein the evaluating the at least one token to determine the product rate further comprises at least one of:
performing a mathematical operation;
performing a logical operation; and
retrieving data from a multi-dimensional table of data stored in the cache.

24. A system for calculating product rates comprising:
a processor configured to request and receive product rate information from a database, the product rate information including at least one product rate expression; and
a memory cache configured to store the product rate information, including the at least one product rate expression, received from the database; the processor being further configured to evaluate the at least one product rate expression by parsing the at least one product rate expression into at least one token and evaluating the at least one token to determine a product rate.

25. A computer readable medium comprising program instructions executable on a processor for calculating a product rate, the computer readable medium being one of an electronic storage medium, a magnetic storage medium, an optical storage medium, and a communications medium conveying signals encoding the instructions, wherein the program instructions are operable to implement each of:
loading product rate information including at least one product rate expression from a database;
storing the product rate information loaded from the database in a cache;
receiving a request for a product rate from a client application running on a computer system;
parsing the at least one product rate expression stored in the cache into at least one token;
evaluating the at least one token to determine the product rate; and
transmitting the product rate to the client application running on the computer system.

26. The computer readable medium of claim 25 wherein the product rate information includes at least one of a multi-dimensional table of data and a numeric value.

27. The computer readable medium of claim 25 wherein the product rate information is stored as a plurality of records in the database.

28. The computer readable medium of claim 25 wherein the receiving a request further comprises receiving consumer information from the client application running on the computer system, the consumer information being used to evaluate the at least one token to determine the product rate.

29. The computer readable medium of claim 25 wherein the product rate information is insurance product rate information.

30. The computer readable medium of claim 25 wherein the loading and storing are performed once, and wherein the receiving, parsing, evaluating, and transmitting are performed a plurality of times.

31. The computer readable medium of claim 25 wherein the at least one token is a plurality of tokens, at least one of the plurality of tokens being an operand, and at least one other of the plurality of tokens being an operator.

32. The computer readable medium of claim 31 wherein the operand is one of a constant numeric value, a variable, a logic value, a function, and a string; and wherein the operator is one of a numeric operator and a logic operator.

33. The computer readable medium of claim 31 wherein the operand and the operator are arranged in the product rate expression following one of post-fix, pre-fix, and in-fix notation.

34. The computer readable medium of claim 25 wherein the evaluating the at least one token to determine the product rate further comprises at least one of:
performing a mathematical operation;
performing a logical operation; and
retrieving data from a multi-dimensional table of data stored in the cache.

35. The product rate calculation system of claim 1,
wherein the database interface is further configured to load a new version of the product rate information into the product rate information cache, in response to the product rate information being modified, and
wherein loading the new version of the product rate information into the product rate information cache reprograms the expression evaluation routine to use a new product rate expression when determining the product rate.

* * * * *